US011276973B2

(12) United States Patent
Liao

(10) Patent No.: US 11,276,973 B2
(45) Date of Patent: Mar. 15, 2022

(54) MULTI-JACK ADAPTER THAT CRADLES ELECTRONIC DEVICE

(71) Applicant: GUANGDONG GOPOD GROUP HOLDING CO., LTD., Shenzhen (CN)

(72) Inventor: Zhuowen Liao, Shenzhen (CN)

(73) Assignee: Guangdong Gopod Group Holding Co., Ltd., Shenzhen (CN)

(*) Notice: Subject to any disclaimer, the term of this patent is extended or adjusted under 35 U.S.C. 154(b) by 0 days.

(21) Appl. No.: 16/624,886

(22) PCT Filed: Jan. 15, 2019

(86) PCT No.: PCT/CN2019/071783
§ 371 (c)(1),
(2) Date: Dec. 19, 2019

(87) PCT Pub. No.: WO2020/147006
PCT Pub. Date: Jul. 23, 2020

(65) Prior Publication Data
US 2021/0344149 A1 Nov. 4, 2021

(51) Int. Cl.
H01R 31/06 (2006.01)
H01R 13/193 (2006.01)

(52) U.S. Cl.
CPC .......... H01R 31/06 (2013.01); H01R 13/193 (2013.01)

(58) Field of Classification Search
CPC ........................................ H01R 31/06–13/193
See application file for complete search history.

(56) References Cited

U.S. PATENT DOCUMENTS 5,586,002 A * 12/1996 Notarianni ............ G06F 1/1626
361/679.26
10,007,296 B2 * 6/2018 Hume .................. H01R 25/006
2016/0028861 A1 1/2016 Pan et al.

FOREIGN PATENT DOCUMENTS

| CN | 206100092 U | 4/2017 |
| CN | 107231766 A | 10/2017 |
| CN | 206922149 U | 1/2018 |
| CN | 107706607 A | 2/2018 |
| CN | 207801095 U | 8/2018 |

OTHER PUBLICATIONS

International Search Report and Written Opinion dated May 29, 2019 for PCT Application No. PCT/CN2019/071783.

* cited by examiner

Primary Examiner — Vanessa Girardi
(74) Attorney, Agent, or Firm — Wolf, Greenfield & Sacks, P.C.

(57) ABSTRACT

The present invention provides an adapter for connecting an electronic device, the adapter comprising an adapter mechanism and a fixing mechanism, wherein the adapter mechanism comprises an adapter controller, an electric connection plug that can be plugged into the electric plug-in interface so as to be electrically connected to the electric plug-in interface, a connecting wire electrically connected to the adapter controller and the electric connection plug, and at least one connecting base. The fixing mechanism is connected to the adapter mechanism and is provided with a plug-in slot for plug-in connection for the electronic device, with a static friction force being provided between a slot wall of the plug-in slot and the electronic device to restrict the electronic device from being separated from the plug-in slot when the electronic device is plugged into the plug-in slot.

14 Claims, 3 Drawing Sheets

MULTI-JACK ADAPTER THAT CRADLES ELECTRONIC DEVICE

RELATED APPLICATIONS

This application is a 371 National Stage application claiming priority to International Application No. PCT/CN2019/071783, filed Jan. 15, 2019. The aforementioned application is incorporated herein by reference, in its entirety, for any purposes.

TECHNICAL FIELD

The present invention relates to the technical field of adapter devices, and in particular to an adapter for electronic device.

BACKGROUND ART

At present, commercially available electronic devices have relatively single interface types, and adapters are needed when other types of interfaces are needed for data connection. At present, most of commercially available adapters for expanding an electric plug-in interface of an electronic device are electrically connected to the electric plug-in interface by means of an electric connection plug on the adapter. However, during use, it is easy to cause the adapter to be lost due to the separate arrangement of the electronic device and the adapter, thus bringing inconvenience for the daily use by users.

SUMMARY OF THE INVENTION

An object of the present invention is to provide an adapter and an electronic device, aiming at solving the technical problem in the prior art.

The present invention is implemented as follows: an adapter for connecting an electronic device having an electric plug-in interface, the adapter comprising:

an adapter mechanism comprising an adapter controller, an electric connection plug that can be plugged into the electric plug-in interface so as to be electrically connected to the electric plug-in interface, a connecting wire electrically connected to the adapter controller and the electric connection plug, and at least one connecting base electrically connected to the adapter controller; and a fixing mechanism connected to the adapter mechanism and provided with a plug-in slot for plug-in connection for the electronic device, with a static friction force being provided between a slot wall of the plug-in slot and the electronic device to restrict the electronic device from being separated from the plug-in slot when the electronic device is plugged into the plug-in slot.

Further, the fixing mechanism comprises a fixing plate and a plug-in block that is connected to the fixing plate and is configured in an L-shape; the plug-in block comprises a connecting part that extends in a strip shape and a bending part that is connected to one side of the connecting part and extends in a direction perpendicular to the extending direction of the connecting part; and the plug-in slot comprises a first slot that is provided at the connecting part and extends in the same direction as the connecting part and a second slot that is provided at the bending part, extends in the same direction as the bending part and is in communication with the first slot, the first slot having an opening direction facing the bending part, and the second slot having an opening direction facing the connecting part.

Further, the connection between the bottom of slot of the first slot and the bottom of slot of the second slot is rounded.

Further, the adapter mechanism further comprises a protective cover connected to the fixing plate, the protective cover and the fixing plate are enclosed together to form an accommodating cavity, the adapter controller is located in the accommodating cavity, the protective cover is provided with at least one jack, and the connecting base is located in the accommodating cavity and is arranged to face the jack.

Further, the protective cover is provided with at least four jacks, and at least four connecting bases are provided and respectively arranged in one-to-one correspondence with the respective jacks.

Further, both the connecting part and the bending part are connected to the fixing plate and located on the same side of the fixing plate, and the plane where the connecting part and the bending part are located is parallel to the plane where the fixing plate is located.

Further, the fixing plate is integrally formed with the plug-in block, and the adapter further comprises a gasket that can be plugged into the plug-in slot.

Further, the adapter further comprises a first magnetic attraction member that is connected to the gasket and a second magnetic attraction member that is connected to the fixing plate and can be magnetically attracted with the first magnetic attraction member.

Further, the fixing mechanism further comprises a sliding connection base that is connected to the fixing plate and protrudes outwards and a stopper mechanism; the plug-in block is slidably connected to the sliding connection base and can move towards or away from the fixing plate in a direction perpendicular to the plane where the fixing plate is located; the stopper mechanism can limit the displacement of the plug-in block; and the plug-in block, the sliding connection base and the fixing plate are enclosed together to form the plug-in slot.

Further, the sliding connection base is provided with an installation slot towards the plug-in block; and the adapter further comprises an elastic member located in the installation slot, with one end of the elastic member being connected to the fixing mechanism and the other end thereof being connected to the bottom of slot of the installation slot.

Further, the elastic member is a spring.

Further, the elastic member is in a stretched state.

Further, the fixing mechanism is provided with a sound hole.

Further, the connecting base comprises at least one of a USB-Type-C interface socket, a USB-Type-B interface socket, a TF card interface socket, an audio interface socket and an HDMI interface socket; and the electric connection plug is at least one of a USB-Type-C connector and an audio connector.

The present invention further provides an electronic device, wherein the electronic device is provided with an electric plug-in interface, has a junction surface and is provided, on the junction surface, with a power amplifier hole for playing sound; the connection between the two right-angled sides of the electronic device is rounded; the electronic device can match and be in plug-in connection with the adapter as described above; and the junction surface can be located in the plug-in slot when the electronic device is plugged into the fixing mechanism.

The present invention has the following technical effects over the prior art: for the adapter of the present invention, by means of providing a fixing mechanism that can be in mechanical plug-in connection with an electronic device, the adapter can be removably connected to the electronic device, and by means of providing an electric connection adapter controller and a connecting wire for an electric connection plug, the electric connection between the electric connection plug and the electric plug-in interface of the electronic device can still be implemented even when the fixing mechanism is in mechanical plug-in connection with the electronic device; the adapter of the present invention can be plugged into the electronic device at any time by means of the fixing mechanism, so that when the adapter is needed, the electric connection plug is electrically connected to the electric plug-in interface, and when the adapted is not needed, it only needs to pull out the electric connection plug without removing the fixing mechanism, so as to solve the problem of the loss or the inconvenience in carrying of the adapter due to the separate arrangement of the adapter and the electronic device; and when the electronic device is transferred, the electric connection plug is not affected by the gravity of the adapter, ensuring the stability in connection with the electronic device, and the connection is not easy to get loose, so that the electric connection between the electric connection plug and the electric plug-in interface will not be affected even when the adapter mechanism or the fixing mechanism is bumped.

BRIEF DESCRIPTION OF THE DRAWINGS

In order to more clearly explain the technical solutions in the embodiments of the present invention, the drawings used in the description of the embodiments of the present invention or the prior art will be briefly introduced below. Obviously, the drawings described below are only some embodiments of the present invention, and the ordinary skilled in the art would have obtained other drawings according to these drawings without any inventive effort.

DESCRIPTION OF REFERENCE SIGNS

Figure 1:
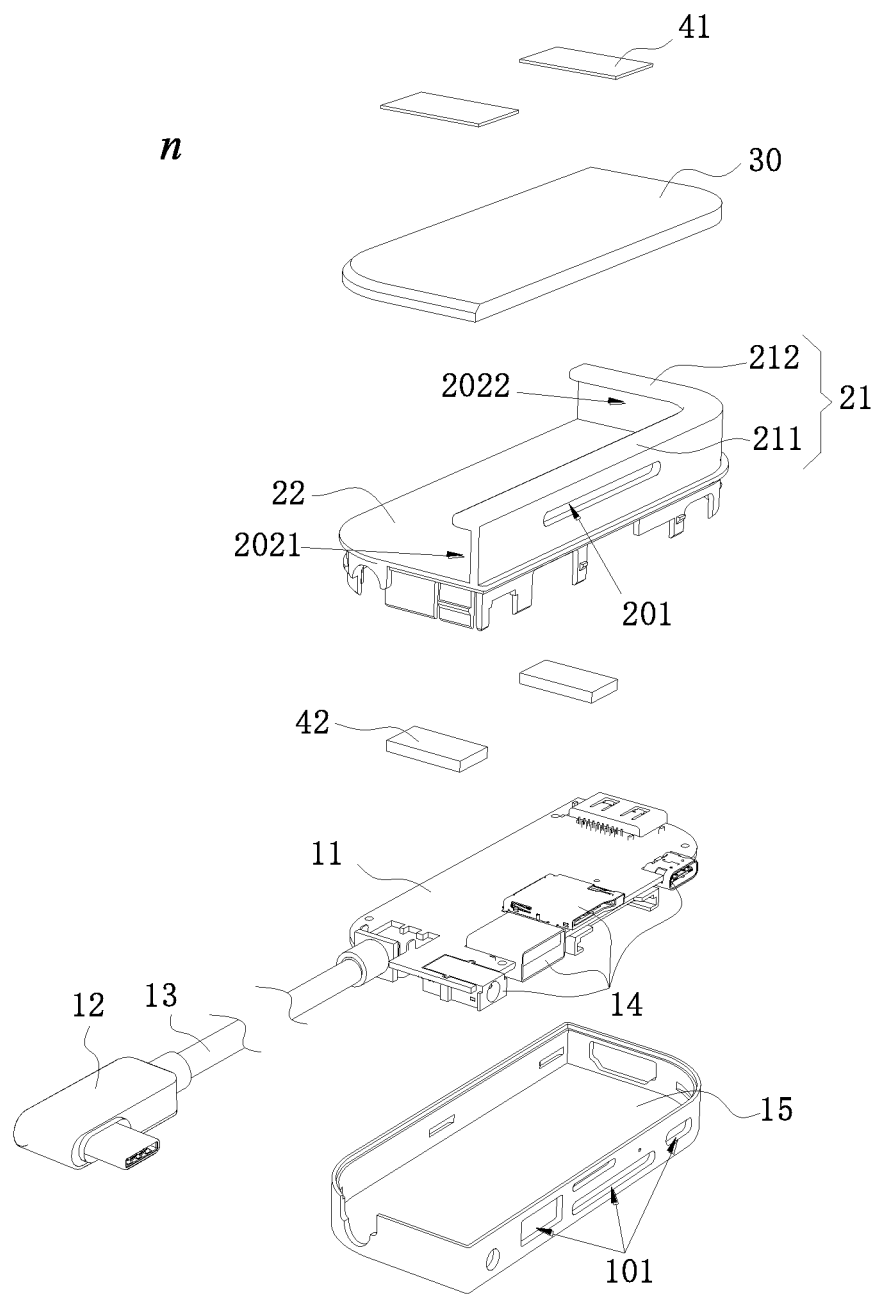
FIG. 1 is an exploded view of an embodiment of an adapter provided by the embodiments of the present invention.

101. Jack; 11. Adapter controller; 12. Electric connection plug; 13. Connecting wire; 14. Connecting base; 15. Protective cover; 21. Plug-in block; 201. Sound hole; 202. Plug-in slot; 2021. First slot; 2022. Second slot; 211. Connecting part; 212. Bending part; 22. Fixing plate; 23. Sliding connection base 231. Installation slot; 30. Gasket; 41. First magnetic attraction member; 42. Second magnetic attraction member; 50. Stopper mechanism; 60. Elastic member

DETAILED DESCRIPTION OF EMBODIMENTS

The embodiments of the present invention are described below in detail, examples of the embodiments are shown in the accompanying drawings, and throughout the drawings, the same or similar reference numerals represent the same or similar elements or elements having the same or similar functions. The embodiments described below with reference to the accompanying drawings are exemplary and are intended to be illustrative of the present invention but will not be interpreted as limiting the present invention.

In the description of the present invention, it should be understood that the orientation or position relationship indicated by the terms such as "thickness", "width" and "bottom" are based on the orientation or position relationship as shown in the accompanying drawings, and are to facilitate the description of the present invention and simplify the description only, rather than indicating or implying that the apparatus or element referred to must have a particular orientation or be constructed and operated in a particular orientation, and will not to be interpreted as limiting the present invention.

In addition, the terms "first" and "second" are for descriptive purposes only and should not be construed as indicating or implying relative importance or implicitly indicating the number of technical features indicated. Thus, the features defined with "first" and "second" can explicitly or implicitly include one or more of the features. In the description of the present invention, the word "multiple" means two or more, unless otherwise specifically defined.

In the description of the present invention, the terms such as "installation", "connecting", "connection" and "fixing" should be understood in a broad sense, for example, it may be a fixed connection or a removable connection or be integrated, may be a mechanical connection or an electric connection, may be a direct connection or a connection via an intermediate medium, or may be the communication between the inside of two elements or the interaction relationship between two elements, unless otherwise explicitly specified or defined. For those of ordinary skilled in the art, the specific meaning of the terms mentioned above in the present invention should be construed according to the specific situation.

In order to make the purposes, technical solutions and advantages of the present invention clearer, the present invention will be described in further detail with reference to the accompanying drawings and embodiments.

The present invention provides an adapter for connecting an electronic device. The electronic device is a flat-panel electronic device, and the electronic device comprises a display panel, a bottom plate arranged opposite to the display panel, and a side wall plate that is connected to the display panel and the bottom plate and is arranged circumferentially, the side wall plate being provided with an electric plug-in interface for data connection and a power amplifier hole for audio. The electronic device applicable to the present invention has at least two sides arranged at a right angle, with the connection between the two right-angled sides being rounded.

Figure 2:
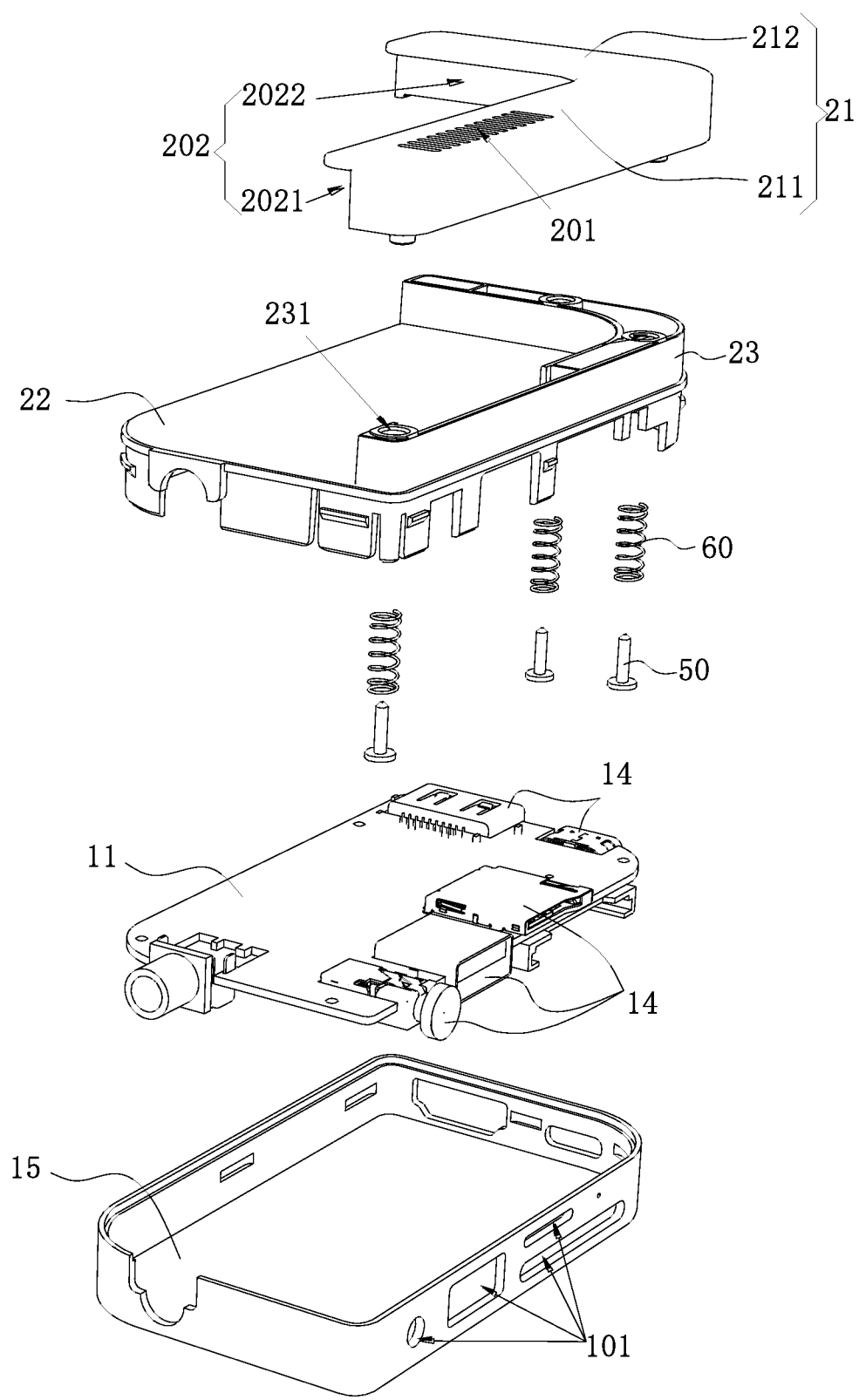
FIG. 2 is an exploded view of another embodiment of an adapter provided by the embodiments of the present invention, with an electric connection plug and a connecting wire being removed.
Figure 3:
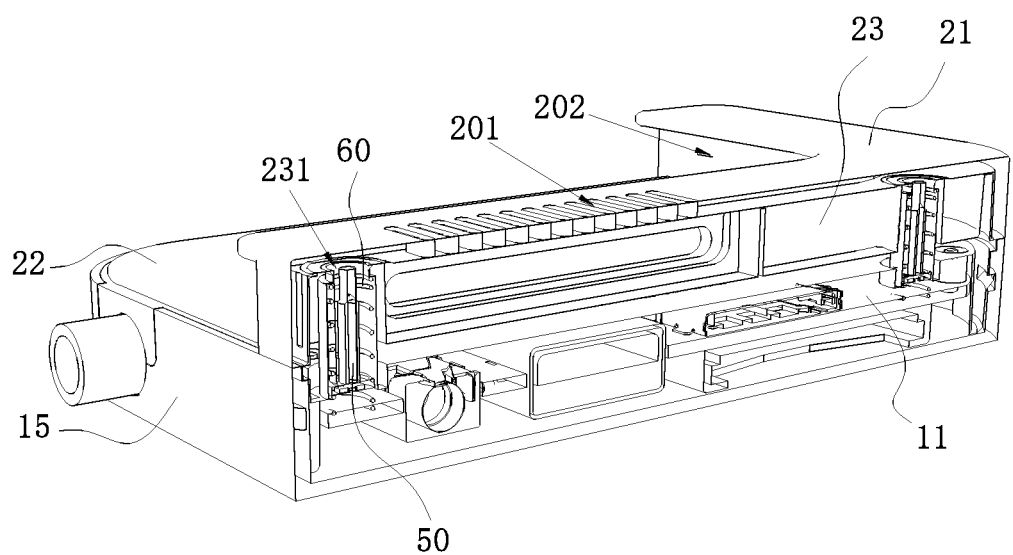
FIG. 3 is a cross-sectional view of another embodiment of an adapter provided by the embodiments of the present invention, with an electric connection plug and a connecting wire being removed.

Referring to FIGS. 1 to 3, the adapter of the present invention comprises a fixing mechanism that can be plugged into an edge of an electronic device and an adapter mechanism that is connected to the fixing mechanism and can be plugged into a socket of the electronic device.

The adapter mechanism comprises an adapter controller 11, an electric connection plug 12 that can be plugged into the electric plug-in interface so as to be electrically connected to the electric plug-in interface, a connecting wire 13 electrically connected to the adapter controller 11 and the electric connection plug 12, and at least one connecting base 14 electrically connected to the adapter controller 11. Preferably, the adapter controller 11 is a PCB, the connecting base 14 is used for the plug-in connection for connectors of other connecting wires, and preferably, the number and type of the electric connection plugs 12 are adapted to the electronic device so that all the electric plug-in interfaces of the electronic device can be adapted.

The fixing mechanism is connected to the adapter mechanism and is provided with a plug-in slot 202 for plug-in connection for the electronic device, with a static friction force being provided between a slot wall of the plug-in slot and the electronic device to restrict the electronic device from being separated from the plug-in slot when the electronic device is plugged into the plug-in slot. The width of the plug-in slot 202 is adapted to the thickness of the electronic device or the thickness of the electronic device that is covered with a protective shell, so that the edge of the electronic device can be smoothly plugged into the plug-in slot 202, the display panel and the bottom plate of the electronic device are respectively fitted to two side walls of the plug-in slot 202 so as to prevent the adapter from being dropped, and preferably, the fixing mechanism can apply a clamping force to the electronic device when the electronic device is plugged into the plug-in slot so as to reinforce the connection therebetween.

The length of the connecting wire 13 is based on the fact that the electric connection plug 12 can be electrically connected to the electric plug-in interface, without affecting the electric connection effect, after the fixing mechanism is in mechanical plug-in connection with the electronic device.

For the adapter of the present invention, by means of providing a fixing mechanism that can be in mechanical plug-in connection with an electronic device, the adapter can be removably connected to the electronic device, and by means of providing an electric connection adapter controller 11 and a connecting wire 13 for an electric connection plug 12, the electric connection between the electric connection plug 12 and the electric plug-in interface of the electronic device can still be implemented even when the fixing mechanism is in mechanical plug-in connection with the electronic device; the adapter of the present invention can be plugged into the electronic device at any time by means of the fixing mechanism, so that when the adapter is needed, the electric connection plug 12 is electrically connected to the electric plug-in interface, and when the adapted is not needed, it only needs to pull out the electric connection plug 12 without removing the fixing mechanism, so as to solve the problem of the loss or the inconvenience in carrying of the adapter due to the separate arrangement of the adapter and the electronic device; and when the electronic device is transferred, the electric connection plug 12 is not affected by the gravity of the adapter, ensuring the stability in connection with the electronic device, and the connection is not easy to get loose, so that the electric connection between the electric connection plug 12 and the electric plug-in interface will not be affected even when the adapter mechanism or the fixing mechanism is bumped.

Referring to FIGS. 1 and 2, specifically, the fixing mechanism comprises a fixing plate 22 and a plug-in block 21 that is connected to the fixing plate 22 and is configured in an L-shape; the plug-in block 21 comprises a connecting part 211 that extends in a strip shape and a bending part 212 that is connected to one side of the connecting part 211 and extends in a direction perpendicular to the extending direction of the connecting part 211; and the plug-in slot 202 comprises a first slot 2021 that is provided at the connecting part 211 and extends in the same direction as the connecting part 211 and a second slot 2022 that is provided at the bending part 212, extends in the same direction as the bending part 212 and is in communication with the first slot 2021, the first slot 2021 having an opening direction facing the bending part 212, and the second slot 2022 having an opening direction facing the connecting part 211. In this way, the opening directions of the first slot 2021 and the second slot 2022 are perpendicular to each other and both face inwards, thus respectively corresponding to the two adjacent right-angled sides of the electronic device, that is, one of the right-angled sides of the electronic device is plugged into the first slot 2021 while the adjacent right-angled side is plugged into the second slot 2022, so that the fixing mechanism can be fixed at one corner of the electronic device, and the L-shaped structure has a limiting effect, further preventing the adapter from being bumped and dropped.

In order to adapt to the external structure of the electronic device, the connection between the bottom of slot of the first slot 2021 and the bottom of slot of the second slot 2022 is rounded so as to be adapted to the rounded corner of the electronic device, so that the side wall plate of the electronic device is fitted to the slot wall of the plug-in slot 202 with a stable connection.

Referring to FIGS. 1 to 3, specifically, the adapter mechanism further comprises a protective cover 15 connected to the fixing plate 22, the protective cover 15 and the fixing plate 22 are enclosed together to form an accommodating cavity, the adapter controller 11 is located in the accommodating cavity, the protective cover 15 is provided with at least one jack 101, and the connecting base 14 is located in the accommodating cavity and is arranged towards the jack 101. The protective cover 15 is used to protect the adapter controller 11 from being bumped, and plugs of other connecting wires can pass through the jack 101 and then be connected in a butt joint with the connecting base 14.

Preferably, multiple connecting bases 14 are provided, each of the connecting bases 14 corresponding to one jack 101. Referring to FIG. 2, in the embodiment of the present invention, the protective cover 15 is provided with at least four jacks 101, and at least four connecting bases 14 are provided and respectively arranged in one-to-one correspondence with the respective jacks 101. Referring to FIGS. 1 to 3, optionally, the connecting base 14 comprises at least one of a USB-Type-C interface socket, a USB-Type-B interface socket, a TF card interface socket, an audio interface socket and an HDMI interface socket. It should be understood that the four connecting bases 14 may be different in type, at least two of or all the connecting bases may be the same in type, and the manufacturer can perform combined processing as required. The second connecting base 14 may also be one of the above five types.

Optionally, the electric connection plug 12 is at least one of a USB-Type-C connector and an audio connector. The side wall plate of a conventional electronic device generally has a USB-Type-C interface socket and an audio interface socket, and in the present invention, two electric connection plugs 12 may be provided, that is, both the USB-Type-C connector and the audio connector are provided simultaneously.

Optionally, the connecting part 211 may be arranged at the fixing plate 22 or at the protective cover 15, and the bending part 212 may be suspended over or placed against the fixing plate 22. Referring to FIGS. 1 to 3, preferably, both the connecting part 211 and the bending part 212 are connected to the fixing plate 22 and located on the same side of the fixing plate 22, the plane where the connecting part 211 and the bending part 212 are located is parallel to the plane where the fixing plate 22 is located, and it should be understood that the fixing mechanism and the adapter mechanism are arranged in an overlapped manner to reduce the space occupied by the adapter.

Referring to FIG. 1, in one embodiment provided by the present invention, the plug-in block 21 is integrally formed with the fixing plate 22, and the side wall of the plug-in slot 202 and the fixing plate 221 are located in the same plane, so that when the fixing mechanism is in plug-in connection with the electronic device, the fixing plate 22 is fitted to the bottom plate of the electronic device so as to improve the fixing effect. The adapter further comprises a gasket 30 that can be plugged into the plug-in slot 202. The thickness of the gasket 30 is the same as the thickness of the protective shell of the electronic device, and the width of the plug-in slot 202 is the thickness of the electronic device that is covered with the protective shell, so that when the electronic device is covered with the protective shell, the gasket 30 is removed for the plug-in connection with the plug-in slot 202, and when the protective shell is removed from the electronic device, the gasket 30 is plugged into the plug-in slot 202 to reduce the available width of the plug-in slot 202, so that the electronic device can be in secure plug-in connection with the plug-in slot 202. Multiple gasket 30 different in thickness may be provided so as to adapt to electronic devices that are different in thickness or are provided with a protective shell different in thickness, thus for different electronic devices or non-standard protective shells, the adapter improves the adaptability of the fixing mechanism by means of the gasket 30.

Referring to FIG. 1, in this embodiment, the adapter further comprises a first magnetic attraction member 41 that is connected to the gasket 30 and a second magnetic attraction member 42 that is connected to the fixing plate 22 and can be magnetically attracted with the first magnetic attraction member 41. The magnetic attraction between the first magnetic attraction member 41 and the second magnetic attraction member 42 improves the connection between the gasket 30 and the fixing plate 22 so as to prevent the gasket 30 from slipping off.

Referring to FIGS. 2 and 3. in another embodiment provided by the present invention, the fixing mechanism further comprises a sliding connection base 23 that is connected to the fixing plate 22 and protrudes outwards and a stopper mechanism 50; the plug-in block 21 is slidably connected to the sliding connection base 23 and can move towards or away from the fixing plate 22 in a direction perpendicular to the plane where the fixing plate 22 is located; the stopper mechanism 50 can limit the displacement of the plug-in block 21; and the plug-in block 21, the sliding connection base 23 and the fixing plate 22 are enclosed together to form the plug-in slot 202. In this way, the sliding connection between the plug-in block 21 and the sliding connection base 23 also makes the width of slot of the plug-in slot 202 variable so as to adapt to electronic devices and protective shells different in thickness, thus improving the applicability. The plug-in block 21 can be fixed at a certain displacement point by the stopper mechanism 50 so that the adjusted width of slot of the plug-in slot 202 is fixed, thus ensuring the plug-in connection stability.

Referring to FIGS. 2 and 3, preferably, the sliding connection base 23 is provided with an installation slot 231 towards the plug-in block 21, and the adapter further comprises an elastic member 60 located in the installation slot 231, with one end of the elastic member 60 being connected to the fixing mechanism and the other end thereof being connected to the bottom of slot of the installation slot 231. The elastic member 60 can prevent the fixing mechanism from being disengaged from the sliding connection base 23, and the elastic member 60 is preferably a spring and is in a stretched state when in a connected state. In this way, the fixing mechanism can be elastically connected to the electronic device, and the spring applies a clamping force to the electronic device by means of its elastic restoring force.

Referring to FIGS. 1 to 3, further, the fixing mechanism is provided with a sound hole 201. The power amplifier hole is prevented from being blocked by the plug-in connection between the fixing mechanism and the electronic device to affect the sound effect of the electronic device. The sound hole 201 can be provided at the bottom of slot or the slot wall of the plug-in slot 202, depending on the position of the power amplifier hole of the electronic device.

An embodiment of the present invention also provides an electronic device comprising the adapters provided in the above embodiments, the adapter having the same structural features and the same functions as the adapters in the above embodiments, which will not be further described here.

The electronic device provided by the present invention is provided with an electric plug-in interface, has a junction surface and is provided, on the junction surface, with a power amplifier hole for playing sound; the connection between the two right-angled sides of the electronic device is rounded; the electronic device can match and be in plug-in connection with the adapter as described above; and the junction surface can be located in the plug-in slot 202 when the electronic device is plugged into the fixing mechanism.

The above embodiments are merely preferred embodiments of the present invention but not intended to limit the present invention, and any modifications, equivalent replacements, improvements, etc. made within the spirit and principle of the present invention should be included within the scope of protection of the present invention.

The invention claimed is:

1. An adapter for connecting to an electronic device, the adapter comprising:
  an adapter mechanism comprising an adapter controller, an electric connection plug configured to be electrically connected to an electric plug-in interface of the electronic device, a connecting wire electrically connected to the adapter controller and the electric connection plug, and at least one socket electrically connected to the adapter controller; and
  a fixing mechanism connected to the adapter mechanism and provided with a plug-in slot configured to receive the electronic device, wherein a slot wall of the plug-in slot is configured to restrict the electronic device from being separated from the plug-in slot when the electronic device is received in the plug-in slot, wherein the fixing mechanism is provided with a sound hole.

2. The adapter of claim 1, wherein the adapter mechanism further comprises a protective cover connecting to a fixing plate of the fixing mechanism, the protective cover and the fixing plate are enclosed together to form an accommodating cavity to receive the adapter controller and the at least one socket, the protective cover is provided with at least one opening arranged to correspond to a respective one of the at least one socket.

3. An adapter for connecting to an electronic device, the adapter comprising:
  an adapter mechanism comprising an adapter controller, an electric connection plug configured to be electrically connected to an electric plug-in interface of the electronic device, a connecting wire electrically connected to the adapter controller and the electric connection plug and at least one socket electrically connected to the adapter controller;
  a fixing mechanism, comprising a fixing plate, connected to the adapter mechanism and provided with a plug-in slot configured to receive the electronic device, wherein a slot wall of the plug-in slot is configured to restrict the electronic device from being separated from the plug-in slot when the electronic device is received in the plug-in slot;

a gasket configured to be plugged into the plug-in slot; and a first magnetic attraction member attached to the gasket and a second magnetic attraction member attached to the fixing plate and configured to be magnetically coupled with the first magnetic attraction member.

4. The adapter of claim 3, wherein the adapter mechanism further comprises a protective cover connecting to a fixing plate of the fixing mechanism, the protective cover and the fixing plate are enclosed together to form an accommodating cavity to receive the adapter controller and the at least one socket, the protective cover is provided with at least one opening arranged to correspond to a respective one of the at least one socket.

5. An adapter for connecting to an electronic device, the adapter comprising:

an adapter mechanism comprising an adapter controller, an electric connection plug configured to be electrically connected to an electric plug-in interface of the electronic device, a connecting wire electrically connected to the adapter controller and the electric connection plug, and at least one socket electrically connected to the adapter controller; and a fixing mechanism connected to the adapter mechanism and provided with a plug-in slot configured to receive the electronic device, wherein a slot wall of the plug-in slot is configured to restrict the electronic device from being separated from the plug-in slot when the electronic device is received in the plug-in slot, wherein the fixing mechanism comprises a fixing plate and a plug-in block that is connected to the fixing plate and is configured in an L-shape; the plug-in block comprises a connecting part that extends in a strip shape and a bending part that is connected to one side of the connecting part and extends in a direction perpendicular to the extending direction of the connecting part; and the plug-in slot comprises a first slot that is provided at the connecting part and extends in the same direction as the connecting part and a second slot that is provided at the bending part, extends in the same direction as the bending part and is in communication with the first slot, the first slot having an opening direction facing the bending part, and the second slot having an opening direction facing the connecting part; and wherein the adapter mechanism further comprises a protective cover connecting to the fixing plate of the fixing mechanism, the protective cover and the fixing plate are enclosed together to form an accommodating cavity to receive the adapter controller and the at least one socket, the protective cover is provided with at least one opening arranged to correspond to a respective one of the at least one socket.

6. The adapter of claim 5, wherein a connection between the first slot and the second slot form a round shape.

7. The adapter of claim 5, wherein the protective cover is provided with at least four openings, and at least four sockets are provided and arranged in one-to-one correspondence with the respective openings.

8. The adapter of claim 5, wherein the fixing plate is integrally formed with the plug-in block, and the adapter further comprises a gasket that can be plugged into the plug-in slot.

9. The adapter of claim 5, wherein the at least one socket comprises at least one of a USB-Type-C interface socket, a USB-Type-B interface socket, a TF card interface socket, an audio interface socket or an HDMI interface socket; and the electric connection plug is at least one of a USB-Type-C connector and an audio connector.

10. The adapter of claim 5, wherein both the connecting part and the bending part are connected to the fixing plate and located on the same side of the fixing plate, and the plane where the connecting part and the bending part are located is parallel to the plane where the fixing plate is located.

11. The adapter of claim 10, wherein the fixing mechanism further comprises a sliding connection base attached to the fixing plate and protrudes outwards; the plug-in block is slidably connected to the sliding connection base and can move towards or away from the fixing plate in a direction perpendicular to the plane where the fixing plate is located; and a stopper mechanism configured to limit displacement of the plug-in block; and the plug-in block, the sliding connection base and the fixing plate are enclosed together to form the plug-in slot.

12. The adapter of claim 11, wherein the sliding connection base is provided with an installation slot towards the plug-in block; and the adapter further comprises an elastic member located in the installation slot and configured to prevent the fixing mechanism from being disengaged from the sliding connection base.

13. The adapter of claim 12, wherein the elastic member is a spring.

14. The adapter of claim 12, wherein the elastic member is in a stretched state.

* * * * *